US010565902B2

(12) United States Patent
Bao

(10) Patent No.: US 10,565,902 B2
(45) Date of Patent: Feb. 18, 2020

(54) DISPLAY PANEL SUPPORT AND SUPPORT ASSEMBLY

(71) Applicants: HKC Corporation Limited, Shenzhen, Guangdong (CN); Chongqing HKC Optoelectronics Technology Co., Ltd., Chongqing (CN)

(72) Inventor: Wenqiang Bao, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 173 days.

(21) Appl. No.: 15/739,984

(22) PCT Filed: Oct. 23, 2017

(86) PCT No.: PCT/CN2017/107256
§ 371 (c)(1),
(2) Date: Dec. 26, 2017

(87) PCT Pub. No.: WO2019/006916
PCT Pub. Date: Jan. 10, 2019

(65) Prior Publication Data
US 2019/0012939 A1 Jan. 10, 2019

(30) Foreign Application Priority Data

Jul. 6, 2017 (CN) .......................... 2017 1 0548048

(51) Int. Cl.
A47B 97/04 (2006.01)
G09F 7/18 (2006.01)
(Continued)

(52) U.S. Cl.
CPC .............. G09F 7/18 (2013.01); F16M 13/04 (2013.01); G09F 15/0018 (2013.01);
(Continued)

(58) Field of Classification Search
CPC .......... F16M 13/04; F16M 11/20; G09F 7/18; G09F 15/0018; G09F 15/0075; G09F 15/0068
(Continued)

(56) References Cited

U.S. PATENT DOCUMENTS 3,370,821 A * 2/1968 Mingis ................... A47B 97/04
248/452
3,799,488 A * 3/1974 Sena ....................... A47B 97/08
248/452
(Continued)

FOREIGN PATENT DOCUMENTS

CN 101687590 A 3/2010
CN 203317265 U 12/2013
(Continued)

OTHER PUBLICATIONS

International Search Report of PCT Patent Application No. PCT/CN2017/107256 dated Apr. 8, 2018.

Primary Examiner — Gwendolyn W Baxter

(57) ABSTRACT

A display panel support and a support assembly are provided. The display panel support includes a base, a pillar support, a first clamping assembly, and a second clamping assembly. The pillar support is detachably mounted to the base. The first clamping assembly is disposed on the pillar support. The first clamping assembly includes a first clamping plate and a first adjusting member. The first adjusting member is used for mounting the first clamping plate to the pillar support and adjusting a distance between the first clamping plate and the pillar support. The second clamping assembly is disposed at a bottom end of the pillar support. The second clamping assembly includes a second clamping plate and a second adjusting member. The second adjusting member is used for mounting the second clamping plate to (Continued)

the pillar support and adjusting a distance between the second clamping plate and the pillar support.

16 Claims, 3 Drawing Sheets

(51) Int. Cl.
    *G09F 15/00*     (2006.01)
    *F16M 13/04*     (2006.01)
    *F16M 11/20*     (2006.01)

(52) U.S. Cl.
    CPC .......... *G09F 15/0075* (2013.01); *F16M 11/20* (2013.01); *G09F 15/0068* (2013.01)

(58) Field of Classification Search
    USPC ....................... 248/451, 452, 453, 441.1, 460
    See application file for complete search history.

(56) References Cited

U.S. PATENT DOCUMENTS

| | | | | |
|---|---|---|---|---|
| 4,436,271 | A * | 3/1984 | Manso | A47B 19/00 |
| | | | | 248/452 |
| 4,553,728 | A * | 11/1985 | Corsello | A47B 23/007 |
| | | | | 248/444.1 |
| 6,202,973 | B1 * | 3/2001 | Navarin | A47B 23/002 |
| | | | | 248/441.1 |
| 6,364,361 | B1 * | 4/2002 | Kushner | B42D 17/00 |
| | | | | 248/441.1 |

FOREIGN PATENT DOCUMENTS

| | | |
|---|---|---|
| CN | 206018179 U | 3/2017 |
| CN | 206163031 U | 5/2017 |

\* cited by examiner

DISPLAY PANEL SUPPORT AND SUPPORT ASSEMBLY

FIELD OF THE INVENTION

The present invention relates to a support, and more particularly to a display panel support and a support assembly.

BACKGROUND OF THE INVENTION

In recent years, the requirements for the optical level and the appearance structure of display panels are getting stricter. The R&D persons of the panel industry need to measure the optical color gamut, uniformity, penetration, crosstalk, gamma, etc. of the prototype frequently. In the actual measurement of the backlight source, optical diaphragm and other devices, it is necessary to remove the front frame, the rear shell and the base of the prototype. Thus, how to make the measured module stand vertically is a problem. The existing optical support is one-piece, not detachable. It is inconvenient for use and movement. The clamping width cannot be adjusted so that the light-blocking distance cannot be adjusted, which is not beneficial for optical measurement. For systems that use the optical technology to detect and measure, a number of mirrors are often used to form an optical system. The mirrors may change the direction of light and deflection, which is critical to the measurement accuracy. Therefore, in order to ensure the reliability of the measurement and in order to establish and maintain the optical system conveniently, it is necessary to provide a display panel support to achieve these functions.

SUMMARY OF THE INVENTION

The primary object of the present invention is to provide a display panel support and a display panel support assembly to solve the problem that the related workers of the panel industry need to stand the panel as well as the inconvenience of use and movement.

According to one aspect of the present invention, a display panel support is provided. The display panel support includes a base, a pillar support, a first clamping assembly, and a second clamping assembly. The pillar support is detachably mounted to the base. The first clamping assembly is disposed on the pillar support. The first clamping assembly includes a first clamping plate and a first adjusting member. The first adjusting member is used for mounting the first clamping plate to the pillar support and for adjusting a distance between the first clamping plate and the pillar support. The second clamping assembly is disposed at a bottom end of the pillar support. The second clamping assembly includes a second clamping plate and a second adjusting member. The second adjusting member is used for mounting the second clamping plate to the pillar support and for adjusting a distance between the second clamping plate and the pillar support.

According to another aspect of the present invention, a display panel support assembly is provided. The display panel support assembly includes two display panel supports. Each of the two display panel supports includes a base, a pillar support, a first clamping assembly, and a second clamping assembly. The pillar support is detachably mounted to the base. The first clamping assembly is disposed on the pillar support. The first clamping assembly includes a first clamping plate and a first adjusting member. The first adjusting member is used for mounting the first clamping plate to the pillar support and for adjusting a distance between the first clamping plate and the pillar support. The second clamping assembly is disposed at a bottom end of the pillar support. The second clamping assembly includes a second clamping plate and a second adjusting member. The second adjusting member is used for mounting the second clamping plate to the pillar support and for adjusting a distance between the second clamping plate and the pillar support.

According to a further aspect of the present invention, a display panel support is provided. The display panel support includes a base, a pillar support, a first clamping assembly, and a second clamping assembly. The pillar support is detachably mounted to the base. The first clamping assembly is disposed on the pillar support. The first clamping assembly includes a first clamping plate and a first adjusting member. The first adjusting member is used for mounting the first clamping plate to the pillar support and for adjusting a distance between the first clamping plate and the pillar support. The second clamping assembly is disposed at a bottom end of the pillar support. The second clamping assembly includes a second clamping plate and a second adjusting member. The second adjusting member is used for mounting the second clamping plate to the pillar support and for adjusting a distance between the second clamping plate and the pillar support. Wherein, the first clamping plate includes a first elongated portion extending in a first direction and a plurality of first claw portions extending from one side of the first elongated portion. The first claw portions extend towards a panel to be clamped. The first direction is parallel to a vertical direction of the pillar support. The second clamping plate includes a second elongated portion extending in a second direction and a plurality of second claw portions extending from one side of the second elongated portion. The second claw portions extend towards the panel to be clamped. The second direction is perpendicular to the first direction. The second elongated portion has a length greater than that of the first elongated portion. The number of the second claw portions is greater than the number of the first claw portions. The first adjusting member includes a first threaded rod and a first nut. One end of the first threaded rod is fixed to the first clamping plate. Another end of the first threaded rod is inserted through a first through hole of the pillar support and connected to the first nut. The second adjusting member includes a second threaded rod and a second nut. One end of the second threaded rod is fixed to the second clamping plate. Another end of the second threaded rod is inserted through a second through hole of the pillar support and connected to the second nut.

In the embodiments of the present invention, the display panel support is used for clamping the display panel to achieve the purpose of accurately measuring the technical parameters of the display panel. This solves the problem that the related workers of the panel industry need to stand the modular panel. Through the adjustment of the adjusting member, various panels of different sizes or different thicknesses can be clamped. The pillar support is detachably connected to the base, which is convenient for carrying and use.

BRIEF DESCRIPTION OF THE DRAWINGS

In order to clearly illustrate the embodiments of the present invention or the technical solutions in the existing technology, the following drawings, which are used in the description, are briefly described. The accompanying drawings in the following description are merely illustrative embodiments of the present invention. For those skilled in the art, the drawings of other embodiments may be obtained according to the accompanying drawings under the premise of not paying creative work.

DESCRIPTION OF THE EMBODIMENTS

The technical solution in the embodiments of the present invention will be described in detail below in conjunction with the accompanying drawings. It will be apparent that the described embodiments are merely part of the embodiments of the present invention and not all embodiments. For those skilled in the art, other embodiments may be obtained based on the embodiments of the present invention under the premise of not paying creative work, without departing from the scope of the present invention.

It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof.

It will be further understood that the terminology used herein is for the purpose of describing particular embodiments only and is not intended to be limiting of the present invention. As used herein, the singular forms "a," "an," and "the" are intended to include the plural forms as well, unless the context clearly indicates otherwise.

Figure 1:
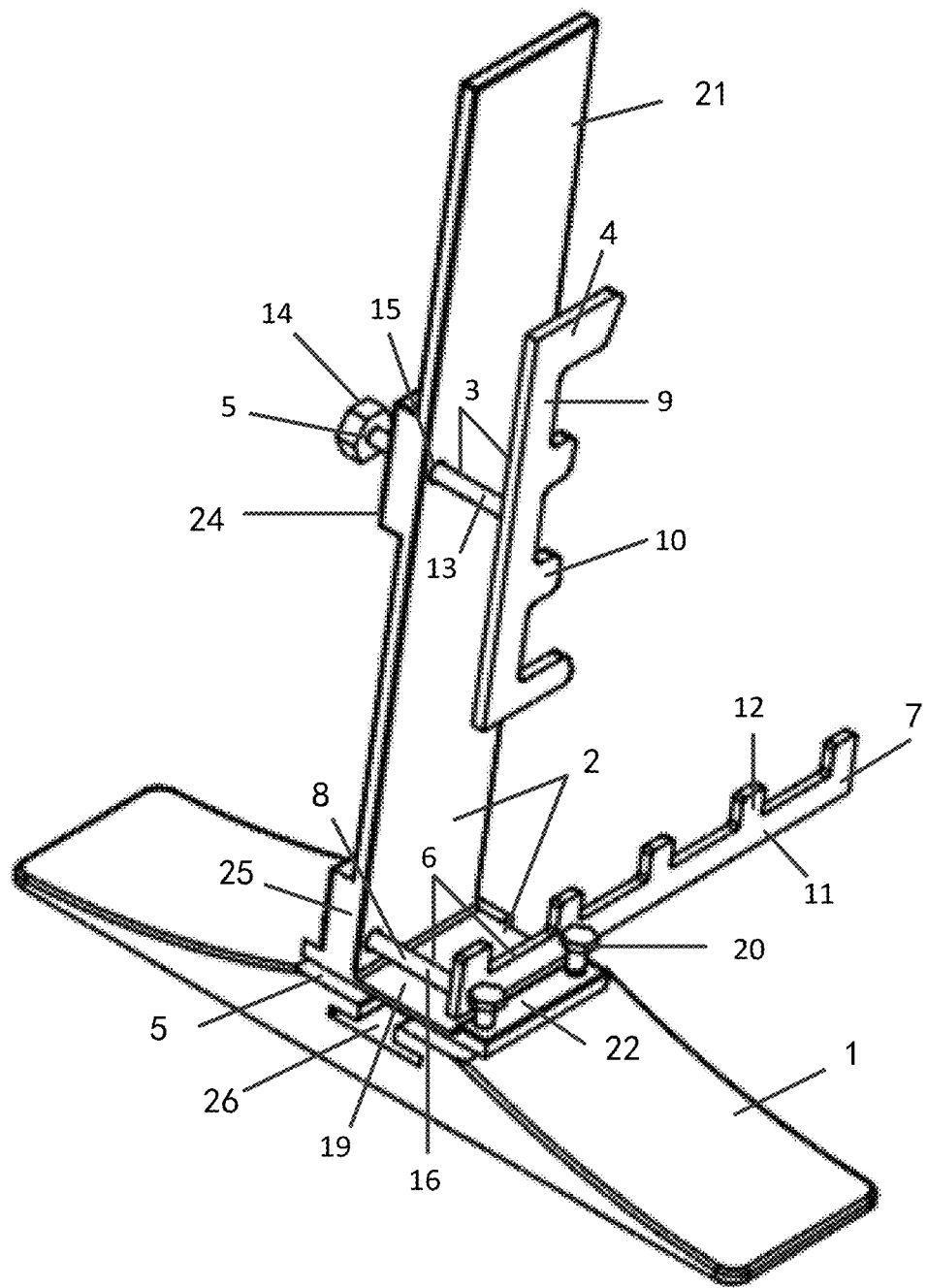
FIG. 1 is a front view of a display panel support in accordance with an embodiment of the present invention.

FIG. 1 is a front view of a display panel support in accordance with an embodiment of the present invention. As shown in FIG. 1, the display panel support in accordance with the embodiment of the present invention includes a base 1, a pillar support 2, a first clamping assembly 3, and a second clamping assembly 6.

The pillar support 2 is detachably mounted to the base 1. The first clamping assembly 3 is disposed on the pillar support 2. The first clamping assembly 3 includes a first clamping plate 4 and a first adjusting member 5. The first adjusting member 5 is used for mounting the first clamping plate 4 to the pillar support 2 and for adjusting the distance between the first clamping plate 4 and the pillar support 2. Through the first adjusting member 5, various panels of different thicknesses can be clamped to meet various demands. The base 1 has a top extending obliquely from a middle portion to two ends thereof. The middle of the top has a platform for mounting the pillar support 2. The curved top has a larger surface area and stronger resistance to stress, which not only looks more beautiful but also saves material.

The second clamping assembly 6 is disposed at the bottom end of the pillar support 2. The second clamping assembly 6 includes a second clamping plate 7 and a second adjusting member 8. The second adjusting member 8 is used for mounting the second clamping plate 7 to the pillar support 2 and for adjusting the distance between the second clamping plate 7 and the pillar support 2. The second clamping assembly 6 cooperates with the first clamping assembly 3 to clamp and retain both sides of the panel firm. If the panel is too large, only the first clamping assembly 3 cannot clamp the panel stably.

Optionally, the first clamping plate 4 includes a first elongated portion 9 extending in a first direction and a plurality of first claw portions 10 extending from the same side of the first elongated portion 9. The first claw portions 10 extend towards the panel to be clamped. The first direction is parallel to the vertical direction of the pillar support 2. The second clamping plate 7 includes a second elongated portion 11 extending in a second direction and a plurality of second claw portions 12 extending from the same side of the second elongated portion 11. The second claw portions 12 extend towards the panel to be clamped. The second direction is perpendicular to the first direction. The claw portions allow the first clamping plate 4 and the second clamping plate 7 to minimize the light-blocking area and to enhance the accuracy of the measurement while ensuring the clamping stability.

Optionally, because the bottom of the panel is longer than the side of the panel, the length of the second elongated portion 11 is greater than the length of the first elongated portion 9, and the number of the second claw portions 12 is also greater than the number of the first claw portions 10.

Optionally, the first adjusting member 5 includes a first threaded rod 13 and a first nut 14. One end of the first threaded rod 13 is fixed to the first clamping plate 4, and another end of the first threaded rod 13 is inserted through a first through hole 15 of the pillar support 2 and connected to the first nut 14. The second adjusting member 8 includes a second threaded rod 16 and a second nut 17. One end of the second threaded rod 16 is fixed to the second clamping plate 7, and another end of the second threaded rod 16 is inserted through a second through hole 18 of the pillar support 2 and connected to the second nut 17. The first threaded rod 13 and the second threaded rod 16 may be welded or screwed to the first clamping plate 4 and the second clamping plate 7, respectively. Through the first nut 14 and the second nut 17, the first clamping assembly 3 and the second clamping assembly 6 can be adjusted for clamping various panels of different thicknesses.

Optionally, the pillar support 2 includes a bottom plate 19 and an upright flat plate 21. The bottom plate 19 is detachably mounted to the mounting platform of the base 1 by a fastener 20 and parallel to the bottom of the base 1 for bearing the panel to be detected. The upright flat plate 21 is vertically connected to the bottom plate 19 and is located at one side of the bottom plate 19. Wherein, the first clamping assembly 3 is disposed on the upright flat plate 21, and the second clamping assembly 6 is disposed at the bottom end of the upright flat plate 21. The bottom plate 19 is integrally formed with the upright flat plate 21. For the stability and the detachable function of the pillar support 2, a plurality of fasteners 20 are provided and arranged at two sides of the bottom plate 19, so that the pillar support 2 is firmly fixed to the mounting platform of the base 1.

Figure 2:
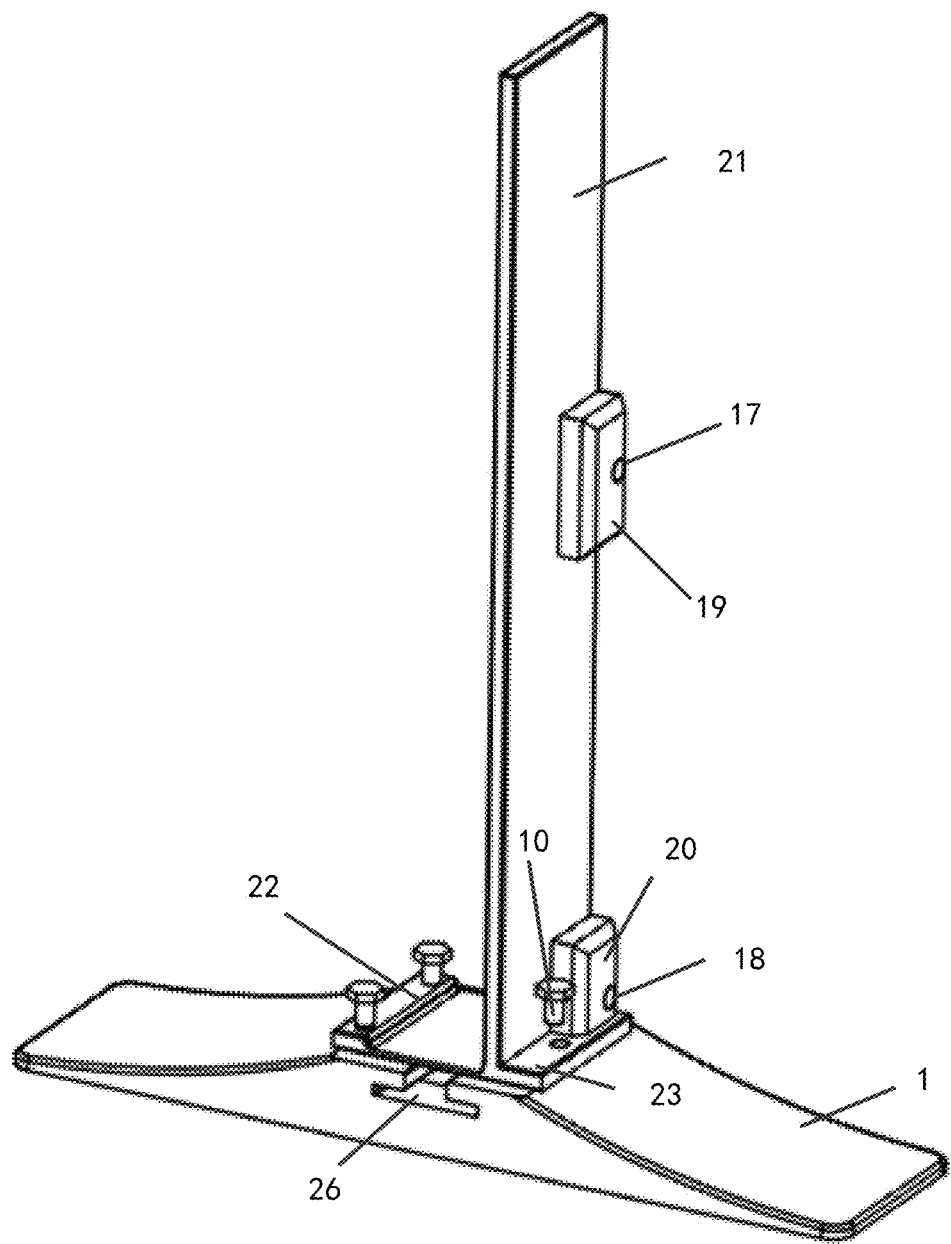
FIG. 2 is a rear view of a display panel support in accordance with an embodiment of the present invention.

FIG. 2 is a rear view of a display panel support in accordance with an embodiment of the present invention. As shown in FIG. 2, one side of the bottom plate 19, close to the second clamping plate 7, is provided with a first elongated projecting platform 22. Another side of the bottom plate 19, close to the second nut 17, is provided with a second elongated projecting platform 23. The bottom plate 19 is fixed to the base 1 by a plurality of screws penetrating through the first elongated projecting platform 22 and the second elongated projecting platform 23 respectively. The installation of the projecting platforms not only enhances the structure but also prevents the bottom plate 19 from being damaged, and can increase the guide of screw and prevent the screw from loosening and deviating. Similarly, one side of the upright flat plate 21, facing away from the first clamping plate 4 and the second clamping plate 7, is formed with a first raised block 24 and a second raised block 25. The first through holes 15 passes through the first raised block 24. The second through hole 18 passes through the second raised block 25.

Optionally, the mounting platform of the base 1 is formed with an inverse T-shaped slit 26 to reduce the material, and the wall of the component has a certain thickness to be shaped easily.

Figure 3:
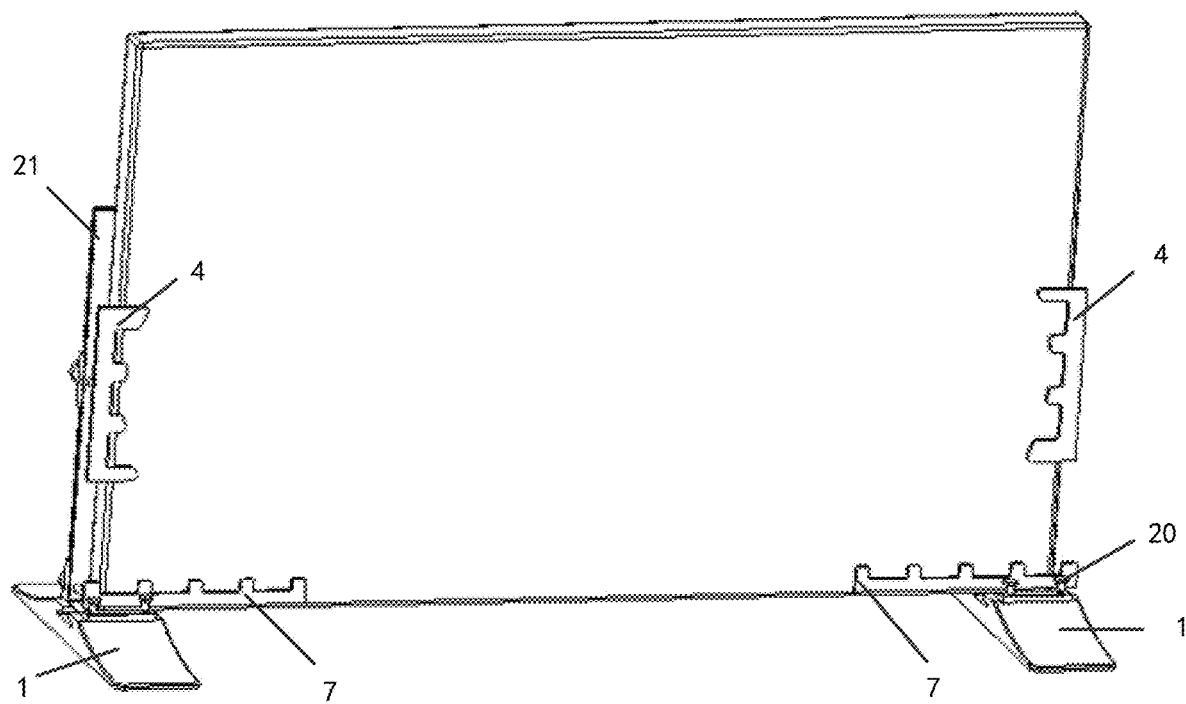
FIG. 3 is a schematic view of a display panel support assembly in accordance with an embodiment of the present invention when in use.

FIG. 3 is a schematic view of a display panel support assembly in accordance with another embodiment of the present invention. The display panel support assembly of this embodiment includes two aforesaid display panel supports. The two display panel supports are assembled as a mirror-symmetry support assembly. If the panel is large, in order to ensure its stability, two or more supports are used to adjust the left and the right for fitting various panels of different sizes.

As described above, the display panel support of the embodiments of the present invention can be used for clamping the display panel to achieve the purpose of accurately measuring the technical parameters of the display panel. This solves the problem that the related workers of the panel industry need to stand the modular panel and avoid a large light-blocking area. Through the claw portions of the clamping plate, the light-blocking area is reduced and the clamping stability is enhanced. Through the adjustment of the adjusting member, various panels of different sizes or different thicknesses can be clamped. Through the fasteners, the base and the pillar support can be disassembled and assembled, which is convenient for carrying and use. If the panel is large, two identical supports arranged in different directions can be used to clamp the panel stably.

In some embodiments, the display panel may be a twisted nematic liquid crystal display panel, a planar conversion liquid crystal display panel, a multi-quadrant vertical alignment liquid crystal display panel, an OLED display panel, a QLED display panel, or other display panels.

The embodiments described above are merely illustrative of several embodiments of the present invention and are more specific and detailed, but are not to be construed as limiting the scope of the present invention. It should be noted that it will be apparent to those skilled in the art that various modifications and improvements can be made therein without departing from the spirit of the present invention, and all of which are within the scope of the present application. Accordingly, the present invention is not to be limited except as by the appended claims.

What is claimed is:

1. A display panel support, comprising:
   a base;
   a pillar support, detachably mounted to the base;
   a first clamping assembly, disposed on the pillar support, wherein the first clamping assembly comprises a first clamping plate and a first adjusting member, the first adjusting member being used for mounting the first clamping plate to the pillar support and for adjusting a distance between the first clamping plate and the pillar support; and
   a second clamping assembly, disposed at a bottom end of the pillar support, wherein the second clamping assembly comprises a second clamping plate and a second adjusting member, the second adjusting member being used for mounting the second clamping plate to the pillar support and for adjusting a distance between the second clamping plate and the pillar support;
   wherein the first clamping plate comprises a first elongated portion extending in a first direction and a plurality of first claw portions extending from one side of the first elongated portion, the first claw portions extend towards a panel to be clamped, the first direction is parallel to a vertical direction of the pillar support;
   wherein the second clamping plate comprises a second elongated portion extending in a second direction and a plurality of second claw portions extending from one side of the second elongated portion, the second claw portions extend towards the panel to be clamped, and the second direction is perpendicular to the first direction;
   the second elongated portion has a length greater than that of the first elongated portion, and the number of the second claw portions is greater than the number of the first claw portions.

2. The display panel support as claimed in claim 1, wherein the first adjusting member comprises a first threaded rod and a first nut, one end of the first threaded rod is fixed to the first clamping plate, another end of the first threaded rod is inserted through a first through hole of the pillar support and connected to the first nut;
   the second adjusting member comprises a second threaded rod and a second nut, one end of the second threaded rod is fixed to the second clamping plate, and another end of the second threaded rod is inserted through a second through hole of the pillar support and connected to the second nut.

3. The display panel support as claimed in claim 2, wherein the pillar support comprises:
   a bottom plate, detachably mounted to a mounting platform of the base by a fastener and parallel to a bottom of the base for bearing the panel; and
   an upright flat plate, vertically connected to the bottom plate and located at one side of the bottom plate;
   wherein the first clamping assembly is disposed on the upright flat plate, and the second clamping assembly is disposed at a bottom end of the upright flat plate.

4. The display panel support as claimed in claim 3, wherein one side of the bottom plate, close to the second clamping plate, is provided with a first elongated projecting platform, another side of the bottom plate, close to the second nut, is provided with a second elongated projecting platform, and the bottom plate is fixed to the base by a plurality of screws penetrating through the first elongated projecting platform and the second elongated projecting platform respectively.

5. The display panel support as claimed in claim 3, wherein one side of the upright flat plate, facing away from the first clamping plate and the second clamping plate, is formed with a first raised block and a second raised block, the first through holes passes through the first raised block, and the second through hole passes through the second raised block.

6. The display panel support as claimed in claim 3, wherein the bottom plate is integrally formed with the upright flat plate.

7. The display panel support as claimed in claim 1, wherein a mounting platform of the base is formed with an inverse T-shaped slit.

8. The display panel support as claimed in claim 1, wherein the base has a top extending obliquely from a middle portion to two ends thereof.

9. A display panel support assembly, comprising two display panel supports, each of the two display panel supports comprising:
   a base;
   a pillar support, detachably mounted to the base;
   a first clamping assembly, disposed on the pillar support, wherein the first clamping assembly comprises a first clamping plate and a first adjusting member, the first adjusting member being used for mounting the first clamping plate to the pillar support and for adjusting a distance between the first clamping plate and the pillar support; and
   a second clamping assembly, disposed at a bottom end of the pillar support, wherein the second clamping assembly comprises a second clamping plate and a second adjusting member, the second adjusting member being used for mounting the second clamping plate to the pillar support and for adjusting a distance between the second clamping plate and the pillar support;
   wherein the first clamping plate comprises a first elongated portion extending in a first direction and a plurality of first claw portions extending from one side of the first elongated portion, the first claw portions extend towards a panel to be clamped, the first direction is parallel to a vertical direction of the pillar support;
   wherein the second clamping plate comprises a second elongated portion extending in a second direction and a plurality of second claw portions extending from one side of the second elongated portion, the second claw portions extend towards the panel to be clamped, and the second direction is perpendicular to the first direction;
   the second elongated portion has a length greater than that of the first elongated portion, and the number of the second claw portions is greater than the number of the first claw portions.

10. The display panel support assembly as claimed in claim 9, wherein the first adjusting member comprises a first threaded rod and a first nut, one end of the first threaded rod is fixed to the first clamping plate, another end of the first threaded rod is inserted through a first through hole of the pillar support and connected to the first nut;
   the second adjusting member comprises a second threaded rod and a second nut, one end of the second threaded rod is fixed to the second clamping plate, and another end of the second threaded rod is inserted through a second through hole of the pillar support and connected to the second nut.

11. The display panel support assembly as claimed in claim 10, wherein the pillar support comprises:
   a bottom plate, detachably mounted to a mounting platform of the base by a fastener and parallel to a bottom of the base for bearing the panel; and
   an upright flat plate, vertically connected to the bottom plate and located at one side of the bottom plate;
   wherein the first clamping assembly is disposed on the upright flat plate, and the second clamping assembly is disposed at a bottom end of the upright flat plate.

12. The display panel support assembly as claimed in claim 11, wherein one side of the bottom plate, close to the second clamping plate, is provided with a first elongated projecting platform, another side of the bottom plate, close to the second nut, is provided with a second elongated projecting platform, and the bottom plate is fixed to the base by a plurality of screws penetrating through the first elongated projecting platform and the second elongated projecting platform respectively.

13. The display panel support assembly as claimed in claim 11, wherein one side of the upright flat plate, facing away from the first clamping plate and the second clamping plate, is formed with a first raised block and a second raised block, the first through holes passes through the first raised block, and the second through hole passes through the second raised block.

14. The display panel support assembly as claimed in claim 11, wherein the bottom plate is integrally formed with the upright flat plate.

15. The display panel support assembly as claimed in claim 9, wherein a mounting platform of the base is formed with an inverse T-shaped slit.

16. A display panel support, comprising:
   a base;
   a pillar support, detachably mounted to the base;
   a first clamping assembly, disposed on the pillar support, wherein the first clamping assembly comprises a first clamping plate and a first adjusting member, the first adjusting member being used for mounting the first clamping plate to the pillar support and for adjusting a distance between the first clamping plate and the pillar support; and
   a second clamping assembly, disposed at a bottom end of the pillar support, wherein the second clamping assembly comprises a second clamping plate and a second adjusting member, the second adjusting member being used for mounting the second clamping plate to the pillar support and for adjusting a distance between the second clamping plate and the pillar support;
   wherein the first clamping plate comprises a first elongated portion extending in a first direction and a plurality of first claw portions extending from one side of the first elongated portion, the first claw portions extend towards a panel to be clamped, the first direction is parallel to a vertical direction of the pillar support;
   the second clamping plate comprises a second elongated portion extending in a second direction and a plurality of second claw portions extending from one side of the second elongated portion, the second claw portions extend towards the panel to be clamped, the second direction is perpendicular to the first direction;
   the second elongated portion has a length greater than that of the first elongated portion, the number of the second claw portions is greater than the number of the first claw portions;
   the first adjusting member comprises a first threaded rod and a first nut, one end of the first threaded rod is fixed to the first clamping plate, another end of the first threaded rod is inserted through a first through hole of the pillar support and connected to the first nut;
   the second adjusting member comprises a second threaded rod and a second nut, one end of the second threaded rod is fixed to the second clamping plate, and another end of the second threaded rod is inserted through a second through hole of the pillar support and connected to the second nut.

\* \* \* \* \*